United States Patent [19]

Hofsess et al.

[11] Patent Number: 5,024,027
[45] Date of Patent: Jun. 18, 1991

[54] TOOL MOUNTING MECHANISM FOR A MACHINE TOOL

[75] Inventors: Alexander Hofsess, Dreieich; Phon Dao-Xuan, Frankfurt, both of Fed. Rep. of Germany

[73] Assignee: Diskus Werke Frankfurt ammain Aktiengesellschaft, Frankfurt, Fed. Rep. of Germany

[21] Appl. No.: 541,589

[22] Filed: Jun. 21, 1990

[30] Foreign Application Priority Data

Jul. 13, 1989 [DE] Fed. Rep. of Germany ....... 3923156

[51] Int. Cl.$^5$ .............................................. B24B 41/04
[52] U.S. Cl. ................... 51/34 H; 51/34 E; 51/168; 51/165.8; 409/231
[58] Field of Search ................... 51/168, 165.77, 165.8, 51/72 R, 109 R, 34 E, 34 H; 409/231, 206, 204, 228

[56] References Cited

U.S. PATENT DOCUMENTS 2,873,560 2/1959 Bretscher ........................... 51/165.8

FOREIGN PATENT DOCUMENTS 2818840 10/1979 Fed. Rep. of Germany .... 51/109 R
0158691 2/1983 Fed. Rep. of Germany ... 51/165.77
434002 12/1974 U.S.S.R. ............................ 51/165.77

*Primary Examiner*—D. S. Meislin
*Attorney, Agent, or Firm*—Dvorak and Traub

[57] ABSTRACT

A tool mounting mechanism for a machine tool, particularly for surface grinding machines, comprises a spindle sleeve, in which a tool spindle, such as a grinding wheel spindle, is mounted without a backlash. The tool spindle has mutually opposite end portions protruding from the sleeve. A tool, such as a grinding wheel, is adapted to be fixed to one of said end portions. A belt pulley is mounted on the other of said end portions. A spindle carrier comprises at least two sleeve guiding means, in which the sleeve is axially slidably mounted. For guiding the sleeve without a backlash, the sleeve is provided on its outside peripheral surface with at least three and particularly with four longitudinal ribs, each of which is movably mounted in two linear roller bearings provided in the sleeve guiding means on both sides of the rib. As a result, any changes of the biasing forces acting on the bearings for the spindle and the means for guiding the sleeve will not influence each other.

7 Claims, 1 Drawing Sheet

TOOL MOUNTING MECHANISM FOR A MACHINE TOOL

BACKGROUND OF THE INVENTION

1. Field of the Invention

This invention relates to a tool mounting mechanism for a machine tool, particularly for a surface grinding machine, comprising a spindle sleeve, a tool spindle, e.g., a grinding wheel spindle, which is mounted without a backlash in said sleeve and has mutually opposite end portions protruding from said sleeve, a tool mounted on one of said end portions, a belt pulley mounted on the other of said end portions, a spindle carrier, which comprises at least two sleeve guiding means in which said sleeve is axially slidably mounted and one screw or a plurality of parallel screws (ball screws), which are connected to each other and to the sleeve by a crosspiece, is or are provided and is or are operable to axially adjust the spindle sleeve.

2. Description of the Prior Art

In known tool mounting mechanisms comprising a spindle sleeve, that spindle sleeve is provided on its outside peripheral surface with screw threads, which are in threded engagement with a nut, which is driven by a shaft for axially moving said sleeve. In accordance with German Patent Specification 894,969, an axial play between the nut and said screw threads is eliminated in that the nut consists of two parts, which are non-rotatably connected to each other and are axially movable relative to each other and axially forced toward each other by spring pressure.

Instead of the provision of such screw-threaded means for axially adjusting the spindle sleeve it is also known to axially adjust a spindle sleeve by means of a single ball or roller screw drive or by means of a plurality of parallel ball or roller screw drives, which are interconnected by a crosspiece. In that case it is essential to eliminate radial backlash.

SUMMARY OF THE INVENTION

It is an object of the invention to provide a tool mounting mechanism which is of the kind described last hereinbefore and which is provided with axial guiding means having no radial backlash.

In a tool mounting mechanism which is of the kind described first hereinbefore, that object is accomplished in that the sleeve is guided without a backlash because it is provided on its outside peripheral surface with at least three and particularly four axially extending ribs, each of which is axially movably mounted in two linear roller bearings provided in a spindle carrier on both sides of the rib. That arrangement ensures that any changes of the biasing forces acting on the spindle bearing means and the sleeve guiding means will not influence each other. Each of the axial ribs for guiding the spindle sleeve is secured to the peripheral surface of the sleeve on one side of the rib and on the other side of the ribs extends into a longitudinal recess of the spindle carrier between linear roller bearings provided on both sides of the rib.

DETAILED DESCRIPTION OF THE PREFERRED EMBODIMENT

Figure 1:
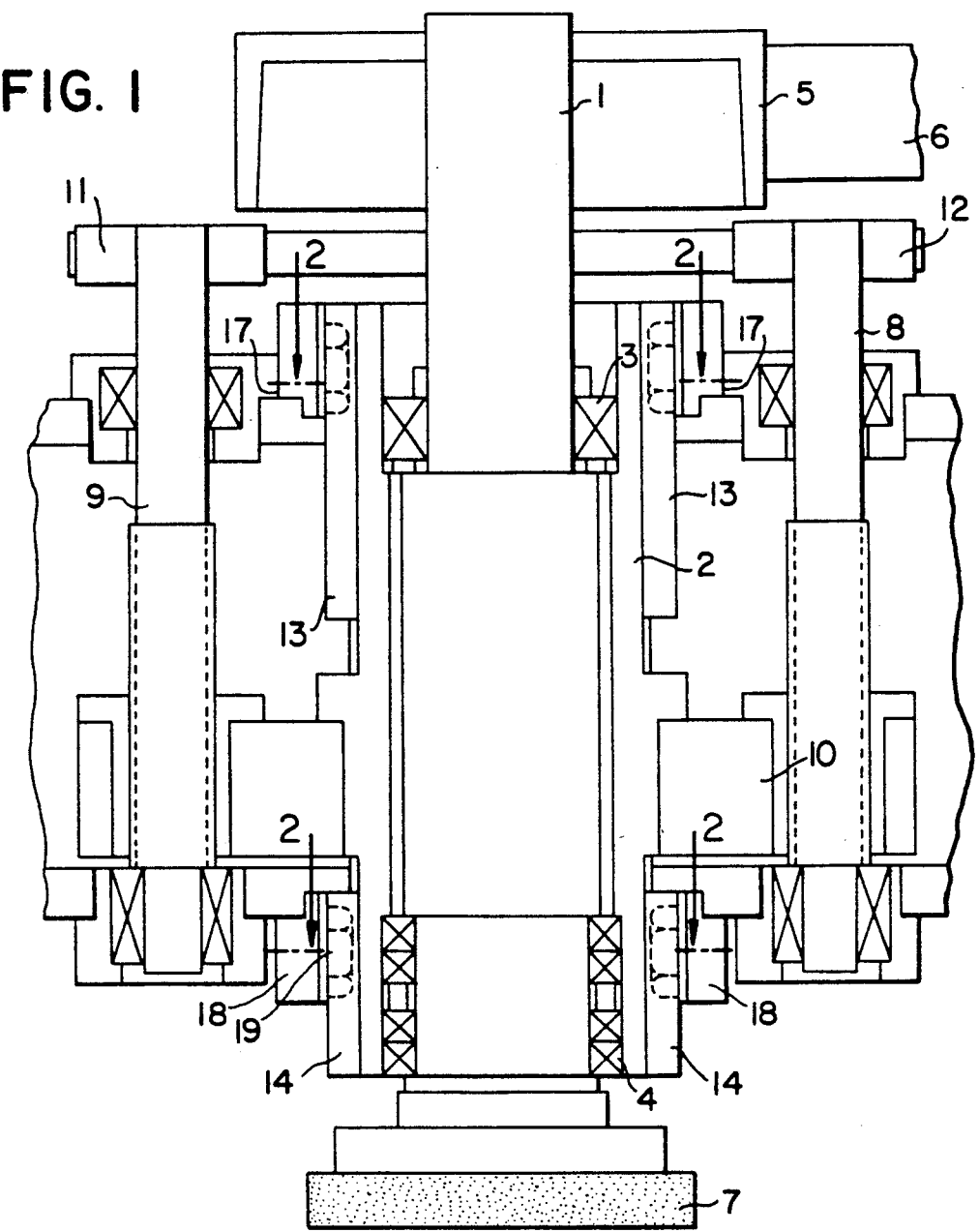
FIG. 1 is a longitudinal sectional view showing a tool mounting mechanism which embodies the invention.
Figure 2:
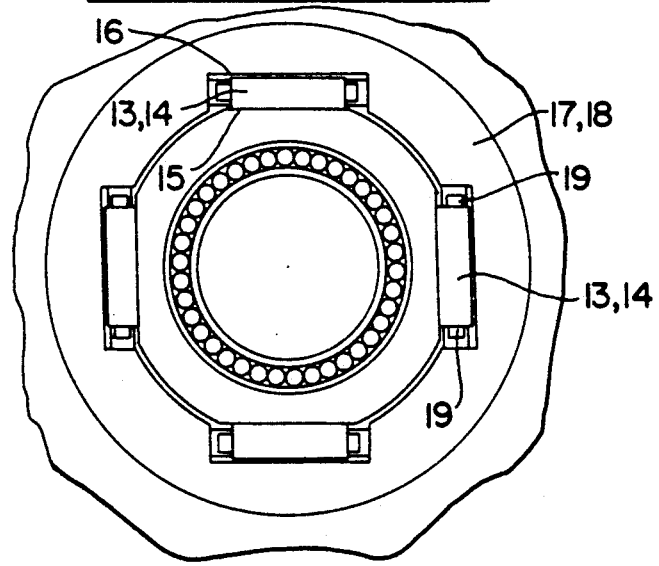
FIG. 2 is a transverse sectional view taken on line II—II in FIG. 1.

A preferred embodiment of a tool mounting mechanism which embodies the invention and is provided in a surface grinding machine will now be described with reference to the drawing.

The tool mounting mechanism shown in the drawing comprises a grinding wheel spindle 1 and a spindle sleeve 2. The grinding wheel spindle 1 is axially coupled to and rotatably mounted in the sleeve 2 by two rolling element bearing means 3 and 4 and has two end portions protruding from the sleeve 2 at opposite ends. One of said end portions of the spindle 1 carries a non-rotatably connected belt pulley 5, which is operatively connected by a belt 6 to a drive motor, not shown. The other end portion of the spindle 1 has secured to it a grinding wheel 7, which is axially adjustable by means of the sleeve 2 and the spindle 1. The sleeve 2 is axially adjustable by means of two parallel screws 8 and 9 and a crosspiece 10 connecting said screws 8 and 9 to the sleeve 2. The screws 8 and 9 consist of ball or roller screws and are operable via respective drives 11 and 12 by a drive motor which is not shown.

The spindle sleeve 2 is guided without a backlash by means of four longitudinal ribs 13 and 14, which are provided on the sleeve 2 adjacent to each end thereof. Each of the ribs 13 and 14 is secured on one side at 15 to the outside peripheral surface of the sleeve 2 and extends on the other side into an associated one of the axially extending recesses 16, which are provided in the two sleeve guiding means 17 and 18 provided in the spindle carrier adjacent to both ends of the sleeve 2. Each of the ribs 13 and 14 extends in the sleeve guiding means 17 or 18 between two linear roller bearings 19 provided on opposite sides of and serving to guide the rib 13 or 14. Adjacent to the linear roller bearings 19, the spindle carrier may be provided with lubricating nipples, which extend to the outside.

We claim:

1. In a tool mounting mechanism for a machine tool comprising a spindle carrier having at least two axially spaced apart sleeve guiding means, a spindle sleeve axially slidably and non-rotatably mounted in said spindle carrier by said sleeve guiding means, a tool spindle, which extends through and is axially coupled to and rotatably mounted in said sleeve and has two opposite end portions axially protruding from said sleeve, one of said end portions being adapted to carry a tool, a belt pulley fixed to the other of said end portions, and screw means for axially adjusting said sleeve in said spindle carrier, the improvement residing in that at least one of said sleeve guiding means comprises at least three axially extending recesses, which are angularly spaced around said sleeve and each of which is provided on opposite sides with two axially extending linear roller bearings and said sleeve has an outside peripheral surface and is provided on said surface with at least three axially extending ribs, each of which extends into one of said recesses and is in contact therein with two of said linear roller bearings.

2. The improvement set forth in claim 1 as applied to a tool mounting mechanism in a surface grinding machine comprising a grinding wheel fixed to said one end portion of said tool spindle.

3. The improvement set forth in claim 1, as applied to a tool mounting mechanism in which said screw means comprise a plurality of axially extending screws and a crosspiece connecting said screws to each other and to said sleeve.

4. The improvement set forth in claim 1, wherein said screws comprise ball screws.

5. The improvement set forth in claim 1, wherein
said sleeve guiding means comprise four of said recesses and
said sleeve is provided on said outside peripheral surface with four of said ribs extending into said recesses.

6. The improvement set forth in claim 1, wherein each of said ribs is secured on one side to said outside peripheral surface of said sleeve and extends on its other side in one of said recesses and in contact with said two linear roller bearings therein.

7. The improvement set forth in claim 1, wherein
two of said spindle guiding means are provided in said spindle carrier adjacent to opposite ends of said sleeve, and
each of said spindle guiding means is formed with at least three of said recesses and
said sleeve is provided adjacent to each of said sleeve guiding means with at least three of said axially extending ribs, each of which extends into one of said recesses in contact therein with two of said linear roller bearings therein.

* * * * *